UNITED STATES PATENT OFFICE.

JEHU W. JOHNSON, OF COLUMBUS, TEXAS.

IMPROVEMENT IN INSECT-DESTROYING COMPOUNDS.

Specification forming part of Letters Patent No. 151,666, dated June 2, 1874; application filed March 3, 1874.

*To all whom it may concern:*

Be it known that I, JEHU W. JOHNSON, of Columbus, county of Colorado and State of Texas, have invented certain new and useful Improvements in Compound for Destroying Cotton-Worms and other Insects, of which the following is a specification:

The nature of my invention consists in a compound for destroying cotton-worms and other insects that infest cotton and other growing plants, and to be applied in the form of mist or spray only. It consists in combining poisonous, adhesive, diffusive, and at the same time fertilizing, ingredients in one and the same compound.

In order to form my compound I use the following ingredients, and preferably in the following proportions, to wit: Eight ounces of arsenious acid, one ounce of cyanide of potassium, and eight ounces of dextrine, dissolved in forty gallons of water.

Arsenious acid, when applied to the leaves of cotton or other plants in the form of spray, will remain free from evaporation for a sufficient length of time to be eaten by such insects as feed upon cotton or other plants. Cyanide of potassium, when applied in like manner as a component part, might be termed the base of said compound, and serves to hold the arsenious acid in solution before it is conveyed to the plant, and, being among the most deadly of all insect poisons, it not only kills when eaten, but is death to insects the instant it strikes them, and so impregnates the air immediately around the plant upon which it has been deposited that the fly or miller which creates the cotton-worm is instantly killed on coming in contact with, or in the immediate vicinity of, the same; and, being a powerful alkali, is easily absorbed by vegetation, and acts as a tonic or fertilizer, thus entirely neutralizing the evil or damaging effects of the arsenious ingredient upon both land and plant. Dextrine, one of the component parts of my compound, has no poisonous effect, but is simply used to produce a thin mucilage of my other ingredients, sufficient to hold the said compound on the plant to which it may be administered—all of which compound is administered upon cotton and other growing plants in the form of very fine mist or spray, thus producing a gentle moisture in the form of dew upon every part of the plant.

As a convenient instrument for the conversion of my compound into spray, and applying the same to cotton or other plants for the purpose aforesaid, I use the devices for which Letters Patent Nos. 145,571 and 145,572 were granted to me December, 16, 1873.

I am aware that Letters Patent have been granted to use one or more of the same ingredients as contained in my compound, but none of which in the form of spray, and have therefore lacked practicability as an insect-poison, from failing to reach every part of the plant, and seriously and sometimes fatally injuring the plants for want of a proper or suitable method of administering the same. It is a fact that any liquid, even water, administered in the form of a shower, such as may be produced by a street-sprinkler or a common watering-pot, will cause cotton to shed all its white blooms, while my compound, or any other liquid not too strong, may be administered in the form of spray without producing such evil effect.

I do not confine myself to the precise proportions of the ingredients herein enumerated, as they may be varied somewhat without materially changing the character or effectiveness of the compound, and instead of dextrine any other mucilaginous substance may be used, if desirable.

Having thus fully described my invention, what I claim as new, and desire to secure by Letters Patent, is—

The compound for destroying insects upon cotton and other growing plants, herein described, prepared in the manner and in substantially the proportions herein set forth, so as to be used as specified.

In testimony that I claim the foregoing as my invention, I hereunto affix my signature this 14th day of February, 1874.

JEHU W. JOHNSON.

Witnesses:
S. J. MORGAN,
D. W. FOURQUREAN.